(12) United States Patent
Yoshino et al.

(10) Patent No.: US 7,388,679 B2
(45) Date of Patent: Jun. 17, 2008

(54) PATTERN LIGHT IRRADIATION DEVICE, THREE DIMENSIONAL SHAPE MEASURING DEVICE, AND METHOD PATTERN LIGHT IRRADIATION

(75) Inventors: Masanao Yoshino, Nagaokakyo (JP); Yoshiro Murata, Nara (JP); Yoshinobu Asokawa, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/525,541

(22) Filed: Sep. 21, 2006

(65) Prior Publication Data

US 2007/0064245 A1    Mar. 22, 2007

(30) Foreign Application Priority Data

Sep. 21, 2005  (JP)  ............................. 2005-274404

(51) Int. Cl.
   *G01B 11/24* (2006.01)
(52) U.S. Cl. ........................................ 356/603; 356/605
(58) Field of Classification Search ......... 356/603–614, 356/3.09, 124, 124.5, 144.5; 382/154; 250/205, 250/559.23
   See application file for complete search history.

(56) References Cited

U.S. PATENT DOCUMENTS

| | | | | |
|---|---|---|---|---|
| 4,062,628 A | * | 12/1977 | Gale | ........................... 359/568 |
| 4,310,242 A | * | 1/1982 | Genco et al. | ................. 356/128 |
| 4,641,972 A | | 2/1987 | Halioua et al. | |
| 4,682,861 A | * | 7/1987 | Hosoya | ....................... 359/650 |
| 5,135,308 A | | 8/1992 | Kuchel | |
| 5,289,264 A | * | 2/1994 | Steinbichler | ................. 356/605 |
| 5,581,352 A | | 12/1996 | Zeien | |
| 5,838,428 A | * | 11/1998 | Pipitone et al. | ............. 356/3.09 |
| 6,040,910 A | | 3/2000 | Wu et al. | |
| 6,222,181 B1 | | 4/2001 | Ichigaya | |
| 6,763,133 B1 | * | 7/2004 | Park et al. | .................... 382/154 |
| 6,956,963 B2 | * | 10/2005 | Ulrich et al. | ................. 382/154 |
| 2002/0006282 A1 | * | 1/2002 | Ushiro et al. | ............... 396/429 |

FOREIGN PATENT DOCUMENTS

| | | |
|---|---|---|
| DE | 40 16 362 A1 | 11/1991 |
| DE | 19502660 | 4/1996 |
| GB | 2 125 648 A | 3/1984 |
| JP | 7-019825 A | 1/1995 |

OTHER PUBLICATIONS

Extended European Search Report for European Application No. 06121059.7-1236 dated Dec. 28, 2006 (6 pages).
Shunichi Kaneko, et al., "Measuring 3-D Shape of Borehole Wall Using Stereo Vision with Increment Sign Correlation" Apr. 13, 2000, 5 pages.
English Abstract of German Publication No. DE19502660 dated Apr. 11, 1996, 1 page.
Chinese Office Action dated Feb. 1, 2008 issued in corresponding Application No. 2006101389370, 11 pages.

* cited by examiner

*Primary Examiner*—Sang H. Nguyen
(74) *Attorney, Agent, or Firm*—Osha Liang LLP (57) ABSTRACT

A light irradiation device for irradiating light having a pattern onto a physical object, includes a pattern forming plate provided with a plurality of opening portions; a light irradiation unit for irradiating light towards the pattern forming plate; and a projection lens irradiated by the light irradiation unit, for integrally condensing light passed through an opening of the pattern forming plate and guiding the condensed light to the physical object, wherein the projection lens is arranged such that an image of the pattern forming plate is not focused onto the physical object, but is projected as a sinusoidal wave pattern.

6 Claims, 12 Drawing Sheets

□ : Opening portion
■ : Masking portion
Opening width < mask width

Fig. 11A

PRIOR ART

Fig. 11B

PRIOR ART

Fig. 12

PRIOR ART

[Fig. 13]

$$h = \frac{L}{d} \cdot \overline{PQ} \qquad \text{Equation (1)}$$

PRIOR ART

☐ : Opening portion
■ : Masking portion
Opening width = mask width

PRIOR ART

Fig. 19

PRIOR ART

PATTERN LIGHT IRRADIATION DEVICE, THREE DIMENSIONAL SHAPE MEASURING DEVICE, AND METHOD PATTERN LIGHT IRRADIATION

BACKGROUND OF THE RELATED ART

1. Field of the Invention

The present invention relates to a light irradiation device and a method of pattern light irradiation, and further relates to a three-dimensional shape measuring device using the pattern light irradiation device.

2. Description of the Related Art

In a three-dimensional shape measuring device, there is one in which a light pattern is projected to a physical body to be a target object and an irradiation pattern is analyzed using a phase analysis method such as a fringe analysis method, thereby obtaining three-dimensional information (height information) of the object. To describe such a device in more detail, first, an image of a pattern forming plate is projected to a target object by irradiating light toward the target object from a light source via a pattern forming plate. Then, the target object in which the image of the pattern forming plate is projected is imaged to obtain an image. Next, a pattern of the image of the pattern forming plate in the image is compared with a pattern when the target object is not set (that is, when there is only a standard plane) and height information is calculated on the basis of the amount of pattern deviation (the amount of phase displacement) generated by setting the target object.

In this case, a sinusoidal wave pattern is mainly used as a pattern to be projected to a measurement physical body. This is because that only a boundary portion between bright and dark sections can be used for height calculation in the case of using a rectangular wave pattern; whereas, in the case of using a sinusoidal wave pattern, height can be calculated on the basis of any part of the wave, thereby improving resolution.

Figures 11A, 11B:
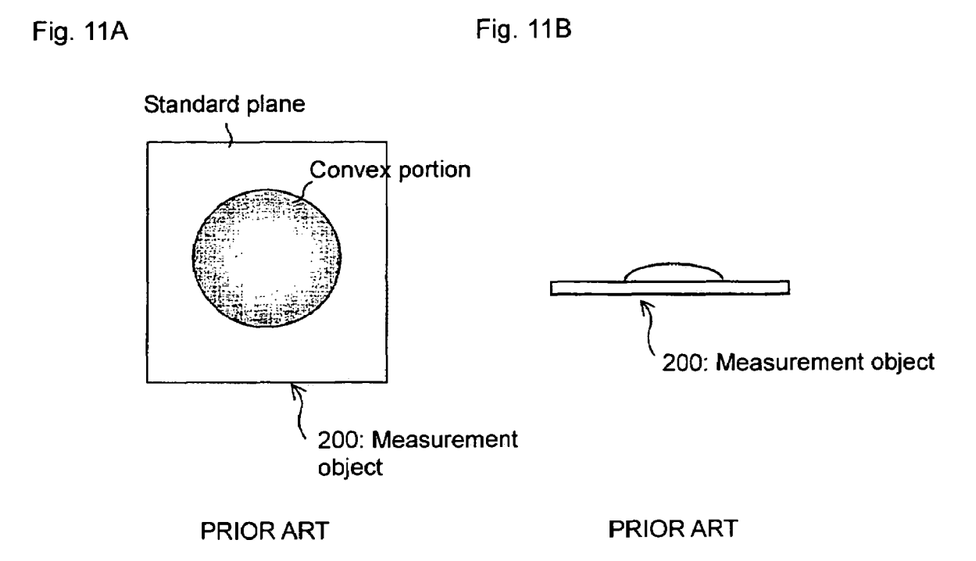
FIG. 11A shows a top view of a shape of a target object.
FIG. 11B shows a side view of the shape of the target object.

An example of the measuring method of the three-dimensional shape measuring device will be described referring to FIG. 11 to FIG. 13. FIG. 11A and FIG. 11B show an example of a target object, each showing a view seen from the upper surface and side surface of the target object. Irradiation of light of a sinusoidal wave pattern onto target object is shown on the left in FIG. 12. In addition, in the drawing, a fringe pattern is depicted in black or white binary without depicting a gradation portion; however, an actual fringe pattern includes gradation having a gradient of luminance.

Figure 12:
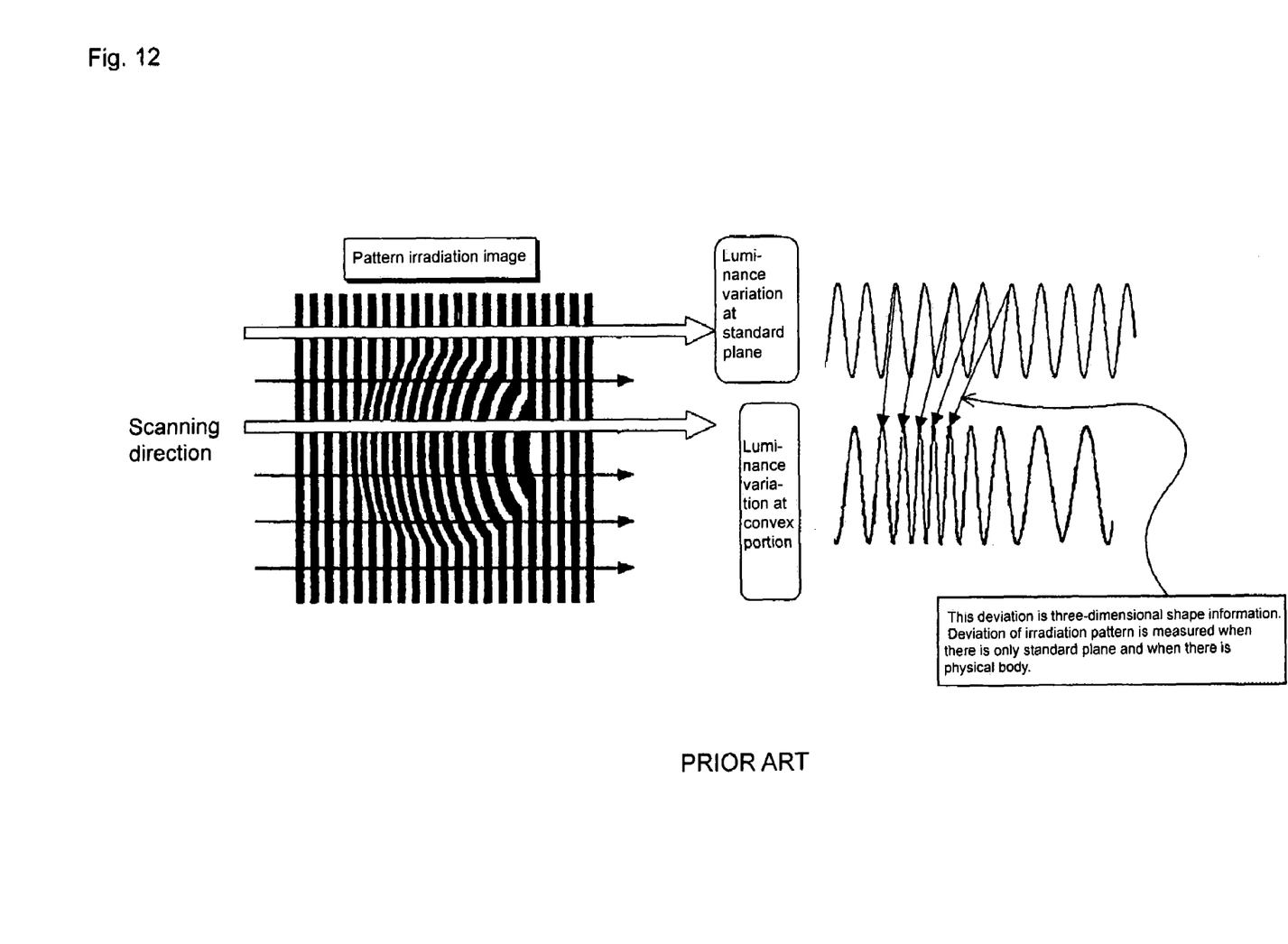
FIG. 12 shows a view of a pattern formed when light of a sinusoidal wave pattern is irradiated to the target object shown in FIG. 11.

As shown in the left view of FIG. 12, when the light of a sinusoidal wave pattern is irradiated onto a physical body having height, the sinusoidal fringe pattern produced varies in response to the height of the physical body. The right view shown in FIG. 12 is a graph showing a relationship between a horizontal position in an image and the luminance value of the irradiation pattern in a standard plane in which the physical body is not present and the luminance value of the irradiation pattern of the physical body. As shown in the same drawing, a phase deviation is generated in the sinusoidal wave pattern projected onto a physical body having height. The height can be calculated from the amount of the phase deviation, based on the triangulation principle shown in FIG. 13.

In the pattern light irradiation device included in a three-dimensional shape measuring device, various methods are used in order to irradiate light of a sinusoidal wave pattern. These methods are outlined briefly hereafter. In a first method, a sinusoidal contrasting density pattern for projecting the sinusoidal wave pattern is formed. In this method, the gradation (contrasting density) is formed on the film so that light of the sinusoidal wave pattern is formed. Exposing the film to or using an inkjet printer to print onto the film photosensitive particles such as silver halide results in the formation of the contrasting density on the film.

Furthermore a second method involves using a liquid crystal projector to irradiate a sinusoidal wave shaped light pattern. In this method, the sinusoidal contrasting density pattern is formed by liquid crystal elements and the contrasting density pattern is projected to a target object by the projector. Controlling and adjusting the transmissivity of individual liquid crystal elements results in a given contrasting density pattern.

A third method involves irradiating a diffraction grating having microscopic slits. In this method, diffraction of light is induced by appropriately adjusting the slit width and pitch and interference effects of the diffracted light form light of a sinusoidal wave.

Furthermore, in a fourth method light, in which amplitude (luminance) modulation is generated with time by a modulating signal, is scanned onto a target object. In this method, amplitude modulation is generated so that a relationship between time and luminance is represented as a sine function and the light is scanned onto the target object, thereby irradiating a sinusoidal wave pattern onto the target object.

The following method is disclosed in Japanese Patent Application Laid-Open No. 8-313209, published on Nov. 29, 1996, hereinafter JPA 8-313209. A position measurement device using a micro lens array is described. The position measurement device includes a light source, a scattering plate for scattering light from the light source, a slit mask for selectively passing the light transmitted through the scattering plate, and a lens array disposed in front of the slit mask. In the position measurement device, the slit and the lens array are combined, whereby each lens of the lens array functions as a pseudo light source. Then, lens focus of the lens array is adjusted, so that lights from neighboring lenses overlap to form light of a pseudo sinusoidal wave pattern.

In recent years, the above-mentioned three-dimensional shape measuring device is often used, for example, inspection of a semiconductor packaging substrate. This is for inspecting the incorrect mounting of a component or a soldering defect by measuring height in respective portions of the substrate. In this case, to increase accuracy of the inspection, high-resolution in μm order is required; however, a pitch of the sinusoidal wave pattern needs to be small for increasing resolution. For example, consider a case in which a sinusoidal wave pattern having 200 pitches per one visual field is projected by the pattern forming plate, which is made of a film formed with the above-mentioned contrasting density pattern. Contrasting density needs to be expressed by dots made of photosensitive particles or printing particles in order to form the sinusoidal contrasting density pattern on the film. For example, in the case when the size of one particle is assumed to be 5 μm and contrasting density used for the sinusoidal wave pattern is expressed by a 256 gradation (8-bit gradation), the size of the film needed for one pitch of the sinusoidal wave is expressed as follows:

5(μm)×256(gradation)×2=2560(μm)

Then, the size of the film required in order to make this for 200 pitches is calculated as:

2560(μm)×200(pitch)=512(mm).

In other words, light passing through the film needs to be converged by a lens having not less than 512 mm in image circle. Such a lens is considerably large and very expensive, as compared with a lens having approximately 43 mm in image circle for use in normal 35 mm film cameras. Consequently, the cost of the pattern light irradiation device increases. This remains a problem even if liquid crystal elements are used to form a sinusoidal contrasting density pattern.

Furthermore, in the method of irradiating light of the sinusoidal wave pattern using the diffraction grating, diffraction phenomenon of light is used and therefore a single wavelength light source is required. That is, a special light source is required and therefore cost of the pattern light irradiation device increases and reduction in size is difficult.

Meanwhile, for the method in which light, in which amplitude modulation is generated with time by a modulating signal, is scanned on a target object is not suitable for analyzing the imaged image. The reason is as follows. Only a part of the sinusoidal wave pattern is imaged in the image taken at a certain moment of the target object and consequently height over the whole of the visual field cannot be calculated from the image obtained by one imaging operation.

Furthermore, in the method using a micro lens array described in JPA 8-313209, when the light source is not of a single wavelength, each lens used in the micro lens array is limited to a single plate (single lens) configuration and therefore focal length changes in response to the wavelength of the light from the light source and the effect of chromatic aberration remains. Thereby, the single wavelength light source is required. Consequently, there arises a problem as in the case of using the diffraction grating.

Further, in the method of using a micro lens array, there is also a problem in it is difficult to change the shape of the irradiation pattern. In the measurement of a three-dimensional shape, in order to change the height resolution the pitch of the sinusoidal wave pattern needs to be changed. Furthermore, in the case of imaging the whole or a part of the physical object to perform pattern matching with a template image together with measurement of the three-dimensional shape, light which is not pattern light but has uniform luminance, that is, light without a pattern needs to be irradiated. When shape of the pattern needs to be changed as described, the entire micro lens array must be replaced. Much cost is required for replacement of the entire micro lens array and therefore changing the shape of the irradiation pattern can prove to be difficult.

SUMMARY

Embodiments of the present invention provide a pattern light irradiation device for irradiating light having a pattern onto a physical object, including a pattern forming plate provided with a plurality of opening portions; a light irradiation unit for irradiating light towards the pattern forming plate; and a projection lens irradiated by the light irradiation unit, for integrally condensing light passed through the opening portion of the pattern forming plate and guiding the condensed light to the physical object, wherein the projection lens is arranged such that an image of the pattern forming plate is not focused onto the physical object, but is projected as a sinusoidal wave pattern.

According to another aspect of the present invention, there is provided a three-dimensional shape measuring device, including the aforementioned pattern light irradiation device; an imaging device for imaging the physical object in which a sinusoidal wave pattern is projected by the pattern light irradiation device; and an image analysis device for analyzing the sinusoidal wave pattern in an image taken by the imaging device and calculating height information of the physical object.

According to a further aspect of the present invention, there is provided a method of irradiating light having a pattern onto a physical object, the method including a light irradiation process for irradiating light towards a pattern forming plate provided with a plurality of opening portions; and a projection process for irradiating the light passed through the pattern forming plate in the light irradiation process onto the physical object as light of a sinusoidal wave pattern, via a projection lens which is arranged out of focus such that an image of the pattern forming plate is not focused onto the physical object.

DETAILED DESCRIPTION

In a pattern light irradiation device includes a pattern forming plate comprising of a plurality of opening and masking portions, a light irradiation unit and a projection lens.

According to one aspect of the present invention, the light irradiation unit irradiates light onto the pattern forming plate forming an image behind the pattern forming plate. The resultant image is condensed and projected by the projection lens onto a physical object.

In this case, the position of the projection lens is arranged at a position which is out of focus so that the image of the pattern forming plate formed is not focused onto the physical object. Thus, the image outline, that is, the contrast formed due to the boundary between the opening portion of the pattern forming plate and the masking portion weakens and consequently the image has light luminance which smoothly lowers from the center of the opening portion to the masking portion. In other words, luminance of the image of the opening portion to be projected onto the physical object becomes a smooth ridge shape whose peak corresponds with the center of the opening portion.

Additionally, beams passed through neighboring opening portions are made to overlap by suitably setting the width of the opening portion and thus the luminance of the image formed by the masking portion becomes a smooth valley shape whose trough corresponds with the center of the masking portion. As a result, it is possible to irradiate a pseudo sinusoidal wave pattern, in which the center of the opening portion is the maximum and the center of the masking portion is the minimum, onto the physical object.

As described above, in one embodiment, the reconstruction of concentration gradient of the sinusoidal wave pattern is not depicted by the contrasting density of digitized (quantized) dot (printing particles in the case of a film and liquid crystal elements in the case of a liquid crystal projector) but is depicted by an analog-like method that is based on displacement of focus. Therefore a smaller pattern forming plate can be used in constructing 1 pitch of the sinusoidal wave pattern.

To provide a detailed example, let us assume that 1 pitch of the opening portion in the pattern forming plate corresponds to 1 pitch of the sinusoidal wave pattern. In this case, since the pattern forming plate is formed by a binary-like area that is the opening portion and the masking portion, the pitch of the opening portion can be reduced as compared with the case that the pattern forming plate is configured by using the film and liquid crystal elements in which reconstruction of the contrasting density is necessary. Thereby, the size of the pattern forming plate for forming a sinusoidal wave pattern with a desired number of waves can be reduced. As a result, a size of the projection lens for projecting light passed through the pattern forming plate can be reduced and thus the manufacturing cost of the pattern light irradiation device is also reduced. In other words, when the projection lens of the same size is used, the sinusoidal wave pattern including a greater number of waves can be irradiated.

Further, the sinusoidal wave pattern is formed by the analog-like method and therefore a sinusoidal wave pattern which is fine and close to the original sinusoidal wave can be formed, using the contrasting density of the digitized dot.

Still, the configuration of the present embodiment is not limited to one in which the projection lens configuration is of a single plate (single lens) configuration like the micro lens array. Therefore, the light source used is not limited to a single wavelength light source, consequently leading to reduction of the manufacturing cost and reduction in the size of the device.

Furthermore, in accordance with another embodiment, the whole area of the sinusoidal wave pattern can be always projected onto the target object, as opposed to a device in which amplitude (luminance) modulation is performed with time using the modulating signal, when the light is projected onto the physical object. In that manner, when the pattern light irradiation device is used, for example, in a three-dimensional shape measuring device, height information of the whole of the required area can be obtained on the basis of the image taken at a certain moment. That is, when the image of the sinusoidal wave pattern is taken, shutter speed can be increased.

Therefore, it can be used in substrate inspection or other similar devices that require measurement when the physical object is moving relative to the imaging device or measurement of a physical device that momentarily varies in shape.

An example in which a pattern light irradiation device is implemented as a pattern projection unit for use in a three-dimensional shape measuring device will be described. In this regard, however, the pattern light irradiation device according to any of the embodiments of the present invention is not limited to the three-dimensional shape measuring device and it is possible to apply for any device provided that light of a sinusoidal wave pattern is irradiated onto a physical body.

Figure 2:
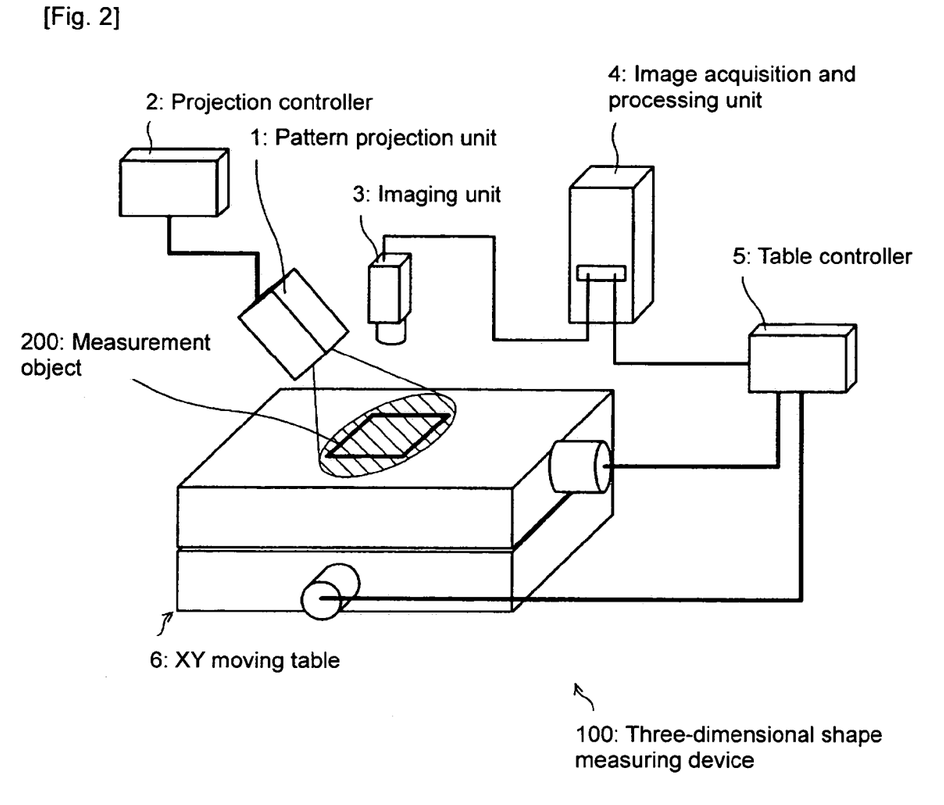
FIG. 2 shows a view of a relevant part configuration of a three-dimensional shape measuring device in an embodiment according to the present invention.

FIG. 2 shows a view of the whole configuration of the three-dimensional shape measuring device. A three-dimensional shape measuring device 100 is for irradiating a pattern light toward a physical body which is a target object to obtain three-dimensional information (height information) of the object by analyzing a pattern projected on the target object using a phase analysis method such as a fringe analysis method. The three-dimensional shape measuring device 100 includes a pattern projection unit (pattern light irradiation device) 1, a projection controller 2, an imaging unit 3, an image acquisition and processing unit 4, a table controller 5, and an XY moving table 6, as shown in FIG. 2.

The pattern projection unit 1 is for irradiating light having a sinusoidal wave pattern onto a target object 200. The target object 200 is, for example, a semiconductor substrate or the like and the pattern projection unit 1 is disposed so as to make an angle with a normal direction of the surface of the target object 200. That is, the pattern light is obliquely irradiated onto the target object 200 from the pattern projection unit 1. In addition, a detailed configuration of the pattern projection unit 1 will be described later.

The projection controller 2 is for controlling the amount of light of the pattern projection unit 1. The imaging unit 3 has a camera and a lens (not shown). The imaging unit 3 images the target object 200 and obtains luminance information of the sinusoidal wave pattern projected onto the target object 200. The obtained image is converted to electronic data by the imaging unit 3 and transmitted to the image acquisition and processing unit 4.

The image acquisition and processing unit 4 fetches the electronic data of the image imaged by the imaging unit 3 and measures three-dimensional shape (height information) of the target object by image processing. In addition, the known various techniques can be used for the method of the measuring three-dimensional shape by the image processing.

The XY moving table 6 is a table for installing the target object 200. The XY moving table 6 can move the target object 200 in the horizontal direction by a motor not shown in the drawing. At this time, the XY moving table 6 can be displaced toward both X-axis and Y-axis directions when a plane including the horizontal direction is assumed as an XY plane. Thereby, the target object 200 can be relatively moved with respect to both the pattern projection unit 1 and the imaging unit 3.

The table controller 5 is for moving the XY moving table 6 by flowing or stopping current to the motor of the XY moving table 6. In addition, the table controller 5 moves the XY moving table 6 based on commands received from the image acquisition and processing unit 4.

Figure 1:
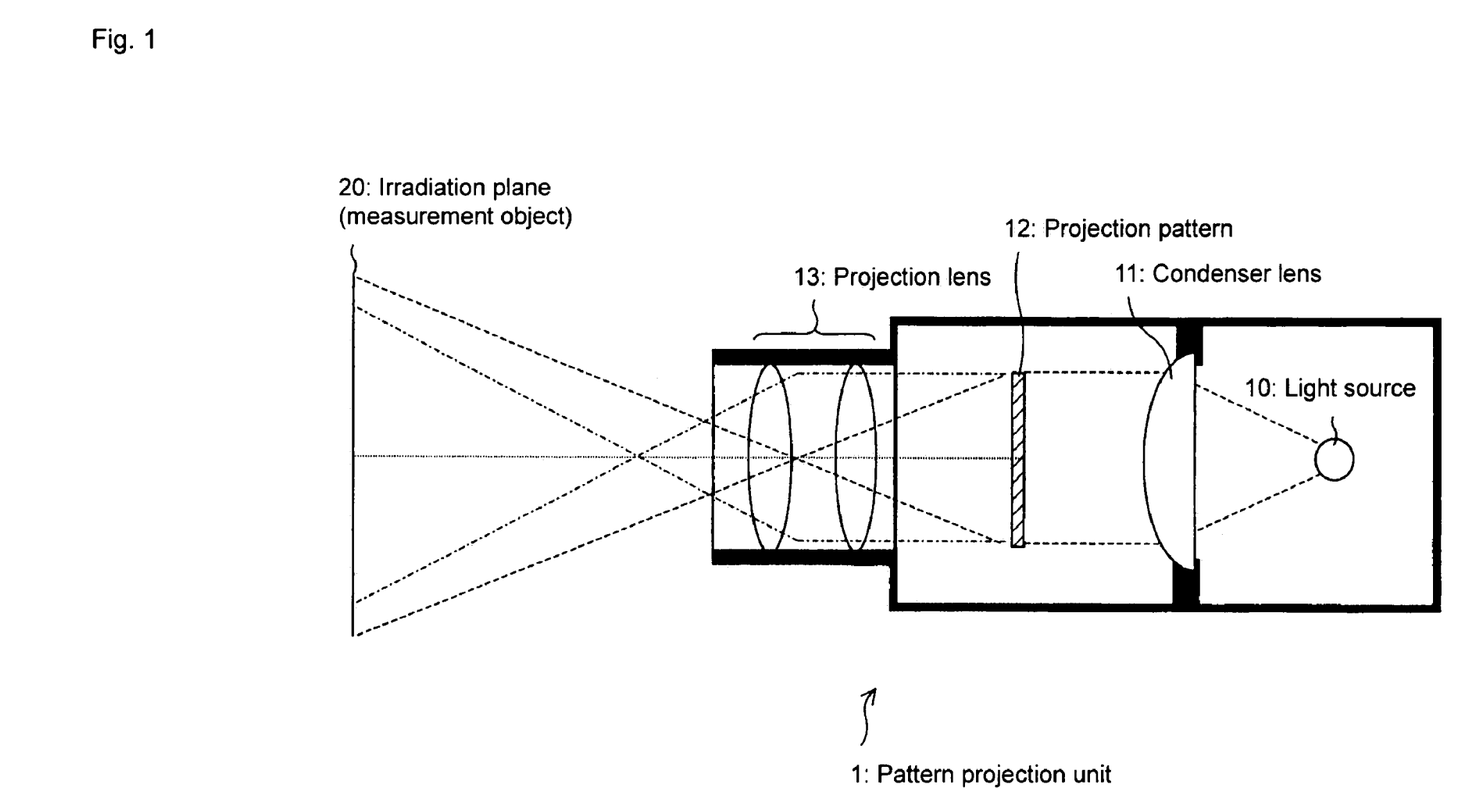
FIG. 1 shows a view of a relevant part configuration of a pattern projection unit in an embodiment according to the present invention.

Next, a detailed construction of the pattern projection unit 1 according to an embodiment of the invention will be described. The pattern projection unit (pattern light irradiation device) 1 includes a light source 10, a condenser lens 11, a projection pattern (pattern forming plate) 12, and a projection lens 13, as shown in FIG. 1.

Various light sources such as an LED, a halogen lamp, or a xenon lamp can be used for the light source 10. The condenser lens 11 is a lens for condensing light irradiated from the light source 10 to form parallel light.

Heretofore in the light source used in a light irradiation device, direction of its light (directivity) is not necessarily uniformed (see Japanese Patent Application Laid-Open No. 7-19825, hereinafter JPA 7-19825); light traveling around the right and left edges opening portions overlap, which lead to an increased luminance at the image center of the projected masking portion. Thereby, the luminance at the dark part of the irradiation pattern increases and causes the contrast of the irradiation pattern to be reduced.

Consequently, the SN ratio of the irradiation pattern lowers and thus there arises a problem in that measurement accuracy is reduced. This problem becomes more remarkable when the mask width is reduced so as to decrease the pitch of the opening portions in order to increase the number of repetition of the irradiation pattern.

Figure 3:
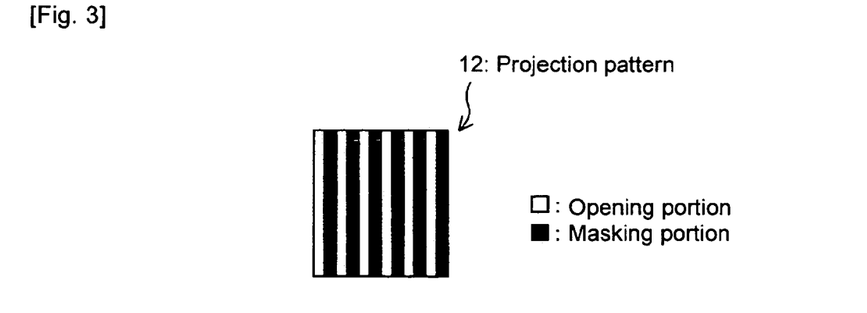
FIG. 3 shows a plan view of a pattern shape provided on a projection pattern in an embodiment according to the present invention.

As shown in FIG. 3, according to this and several embodiments of the invention, the projection pattern 12 is one in which a plurality pairs of rectangular (oblong) opening portions and masking portions, each having a predetermined width, are disposed in parallel, that is, in a grid-like shape. In other words, it may be said that the projection pattern 12 is one in which a plurality of opening portions each having a predetermined opening width are disposed at a predetermined intervals.

In this case, the opening portion functions as an area through which light is passed (is transmissive) and the masking portion functions as an area through which light is not passed (is not transmissive). As described, the pattern projection unit 1 of this embodiment does not use a projection pattern having a sinusoidal contrasting density pattern, but the pattern projection unit 1 may use a projection pattern in which a binary-like area of the opening portion and the masking portion is arranged in a grid-like pattern.

In another embodiment of the present invention, the width of the opening portion (that is, mask width) is larger than the opening width, in other words, the center of the masking portion is kept away from the opening portion, thereby reducing the amount of light that travels around the central portion of the image from the opening portion to the masking portion. As a result, luminance at the image center of the masking portion can be reduced.

That is, the minimum luminance value in the sinusoidal wave pattern can be decreased, thereby increasing the amplitude of the sinusoidal wave pattern. This means that the contrast of the sinusoidal wave pattern increases and the SN ratio increases. Therefore, if height information of the physical object is measured using the sinusoidal wave pattern, high accuracy measurement can be made.

Figure 4:
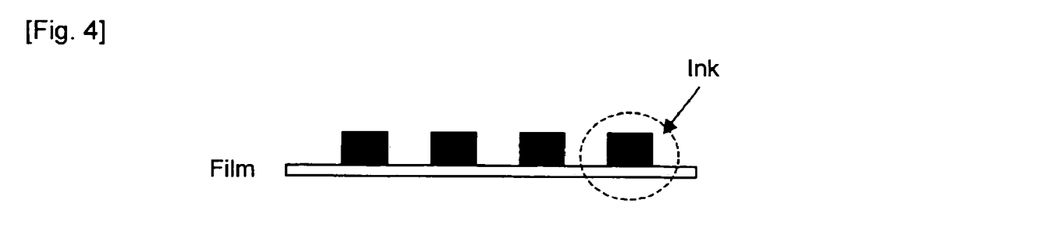
FIG. 4 shows a side view of a configuration example of a projection pattern in an embodiment according to the present invention.
Figure 5:
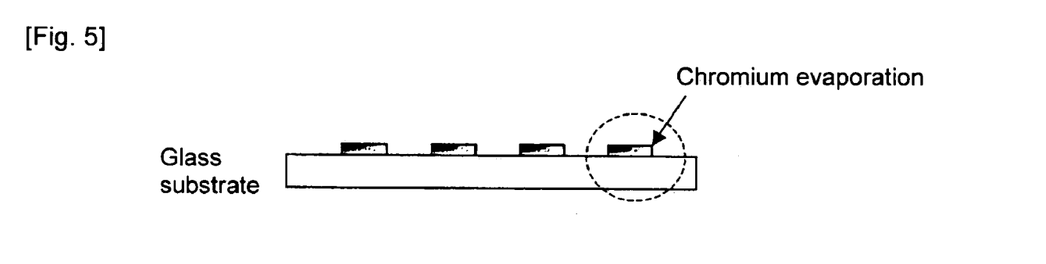
FIG. 5 shows a side view of a configuration example of a projection pattern in another embodiment according to the present invention.

Manufacturing method of the projection pattern 12 is not particularly limited. For example, as shown in FIG. 4, it may be manufactured by putting ink in a grid-like pattern (printing) on the surface of a print film; alternatively, as shown in FIG. 5, it may be manufactured by performing chromium evaporation in a grid-like pattern on a glass substrate. As with several embodiments of the invention, the projection pattern 12 can be constructed by arranging liquid crystal elements in a lattice shape.

In further embodiments, the projection pattern 12 is composed of a plurality of liquid crystal elements; and the opening portions of the pattern forming plate and a masking portion sandwiched by the opening portions are formed by the presence or absence of applying voltage to the liquid crystal elements.

Thus, the presence or absence of voltage applied to the aforementioned elements determines whether or not the element functions as an opening portion or a masking portion, that is, whether or not the light is transmitted or blocked. Consequently, transmission/blockage of light from the light source in the element can be easily switched by only having to change whether or not voltage is applied.

Thereby, for example, it is easy to change the pitch of the pattern in order to vary the resolution and toggle the presence or absence of the pattern in order to perform pattern matching with a template image by imaging the entire physical object.

Figure 6:
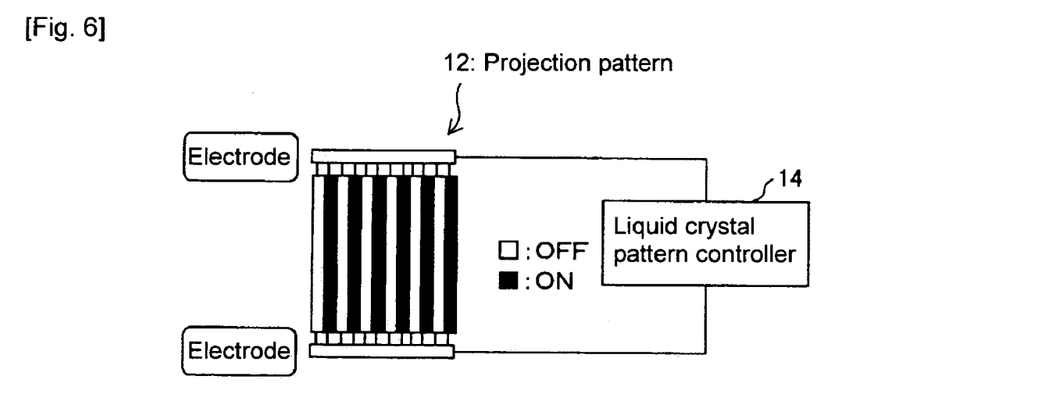
FIG. 6 shows a plan view of a configuration example of a projection pattern in an embodiment according to the present invention.
Figure 7:
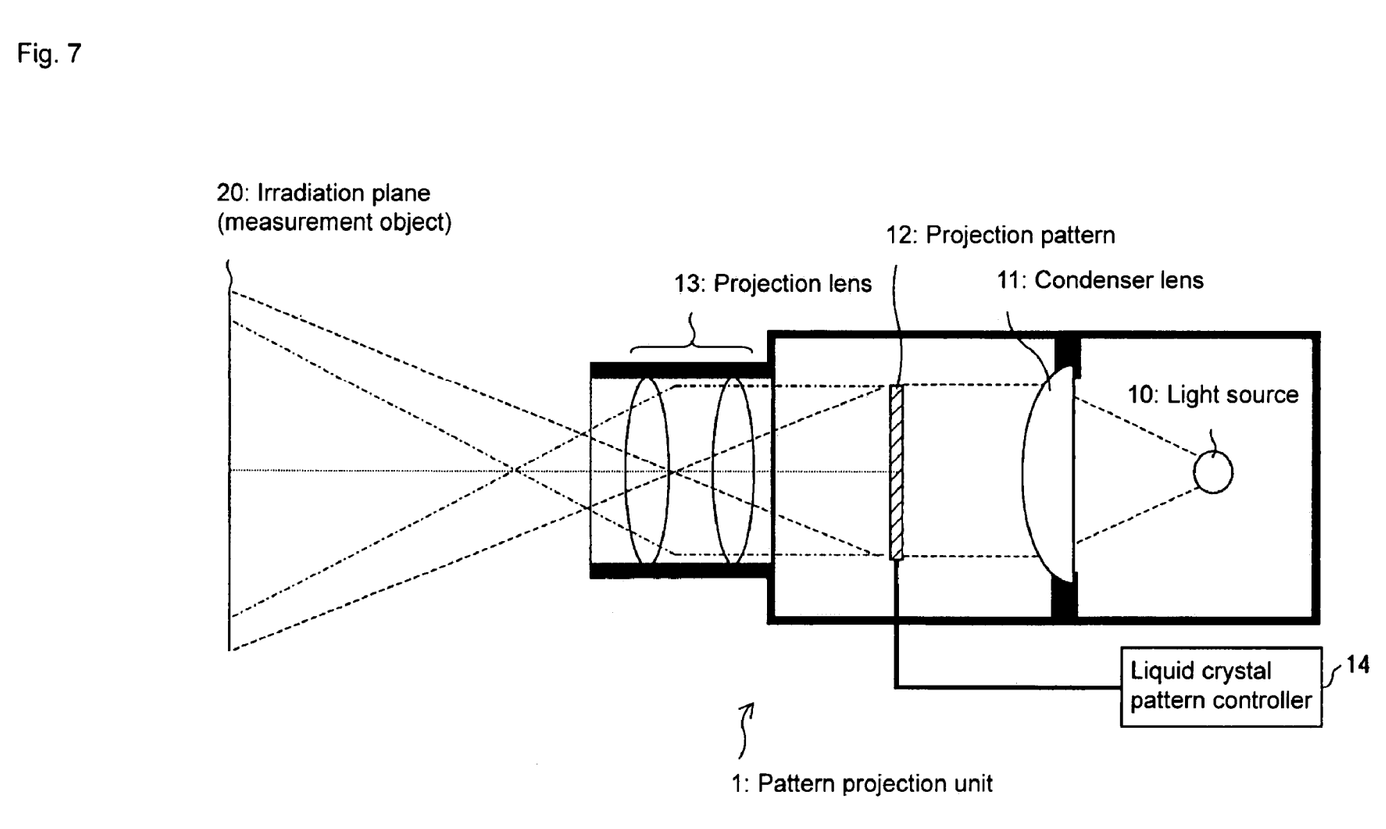
FIG. 7 shows a view of a relevant part configuration of a pattern projection unit in another embodiment according to the present invention.

FIG. 6 shows an example of a projection pattern 12 constructed using liquid crystal elements. In this case, a pattern projection unit 1 further includes a liquid crystal pattern controller 14 connected to individual electrodes of the projection pattern 12 composed of liquid crystal elements, as shown in FIG. 6 and FIG. 7. Then, a liquid crystal pattern controller 14 performs on/off control of applying voltage to the individual liquid crystal elements, thereby forming an opening portion and a masking portion of the projection pattern 12.

As described, the projection pattern 12 is configured by the liquid crystal elements and the liquid crystal pattern controller 14 toggles application of voltage to the liquid crystal elements, whereby a pattern to be projected onto the target object 200 can be easily changed. In addition several scenarios for pattern switching may be included.

For example, in the case of switching from three-dimensional measurement necessary for light of a sinusoidal wave pattern to measurement for obtaining a pattern matching image necessary for uniform luminance light, or in the case of switching the pattern pitch depending on the fineness of the target object 200.

A projection lens 13 is a lens for integrally condensing parallel light passed through the projection pattern 12 to irradiate to a target object 200. Thereby, an image of the projection pattern 12, that is, a pattern composed of the opening portions and the masking portion is projected onto the target object 200.

In this case, in the pattern projection unit 1 of this embodiment, a projection lens 13 is arranged a position which out of focus so that the image of the projection pattern 12 projected to the target object 200 is not focused onto the target object 200, as shown in FIG. 1 and FIG. 7.

In addition, the projection lens 13 may be of a single lens configuration; however, in this embodiment a compound lens configuration, for example one in which two single lenses are arranged in series in the optical path direction, can be used. In addition, the number of the single lenses having the projection lens 13 is not limited to two, but may be three or more. As described above, the projection lens 13 is a compound lens configuration, thereby reducing chromatic aberration due to difference in wavelength even though light irradiated from the light source 10 is not a single wavelength light.

A condenser lens 11 condenses light from the light source 10, before it reaches the projection pattern 12; this results in increased energy efficiency of pattern projection unit 1. As a result, the light irradiated towards the opening portion of the projection pattern 12 is of uniform luminance and the light irradiated towards the masking portion is blocked, whereby an image (that is, a pattern) of the opening portion and the masking portion is formed behind the projection pattern 12.

Then, the light that passed through the projection pattern 12 is irradiated onto the target object by the projection lens 13. In this case, the projection lens 13 is arranged out of focus as described above and therefore pattern light passed through the projection lens 13 is projected on an irradiation plane of the target object 200 as a sinusoidal wave pattern. This principle will be described below in detail.

First, the case in which the projection lens has been brought into focus and the light passing through the projection pattern 12 is ideal (complete) parallel light is considered. In this case, the image of the projection pattern 12 is focused onto the target object 200 and luminance of the pattern projected to the target object 200 becomes a graph depicted as a solid line shown in FIG. 8. That is, the image always shows the maximum luminance at the opening portion, decreases from the maximum value to the minimum value at a boundary between the opening portion and the masking portion, and always shows the minimum luminance at the masking portion.

Figure 8:
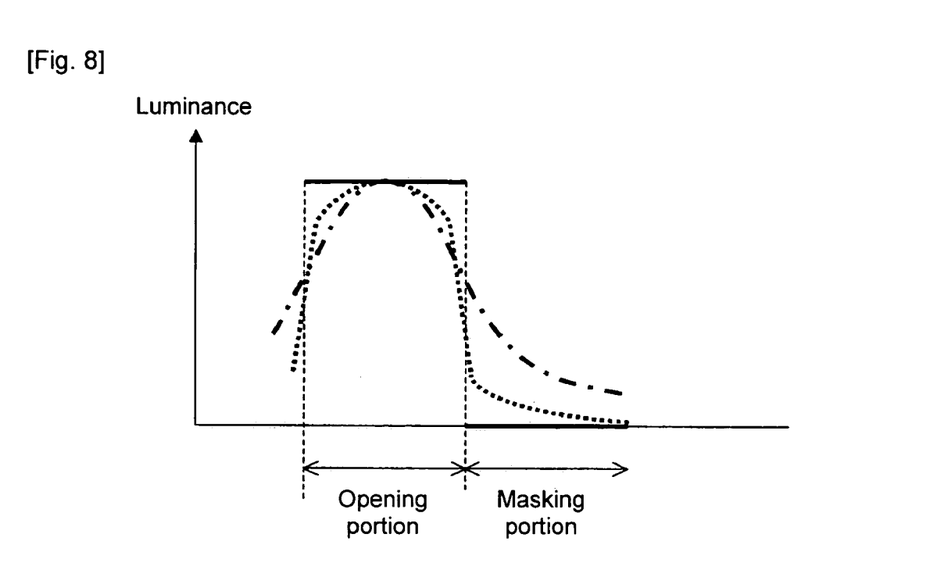
FIG. 8 shows a view of luminance at an opening portion and a masking portion of an image of a projection pattern projected to a target object.

However, in fact, the light that passes through the projection pattern 12 is not ideal parallel light and therefore blur is generated at the boundary portion between the opening portion and the masking portion as shown by a dash line in FIG. 8. That is, the image luminance is the maximum at the opening portion center, decreases in the vicinity of the boundary between the opening portion and the masking portion, and is the minimum at the farthest position from the opening portion of the masking portion.

Figure 9:
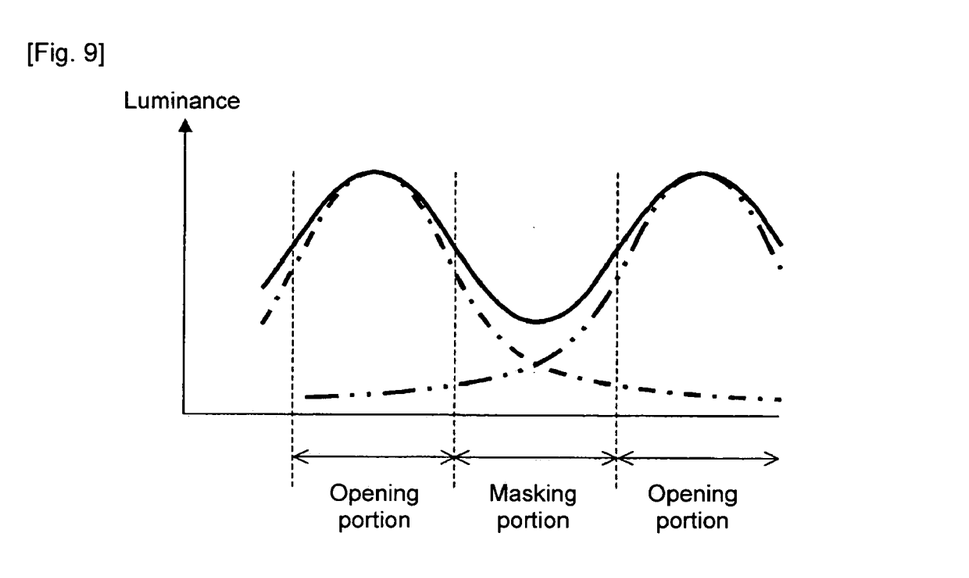
FIG. 9 shows a view of luminance at an opening portion and a masking portion of an image of a projection pattern projected to a target object.

In this case, in this embodiment, the projection lens 13 is out of focus, whereby luminance gradient from the opening portion center to the masking portion further becomes smooth as shown by a dashed dotted line in FIG. 8. Then, uncollimated light from neighboring opening portions can be made to overlap by adjusting the width of the masking portion, that is, distance between the opening portions. FIG. 9 shows a graph of luminance at this time.

As shown in FIG. 9, the above-mentioned luminance (dashed dotted line) and luminance (dashed double-dotted line) of uncollimated light from the neighboring opening portions that overlap to become luminance (solid line) of a pseudo sinusoidal wave shape. In doing so, the sinusoidal wave pattern in which luminance is the maximum at the opening portion center and the minimum at the masking portion center is formed on the irradiation plane of the target object 200.

The above-mention does not particularly refer to ratio between the opening portion and the masking portion of the projection pattern 12, but that width of the masking portion is larger than that of the opening portion. This will be described below.

Figure 19:
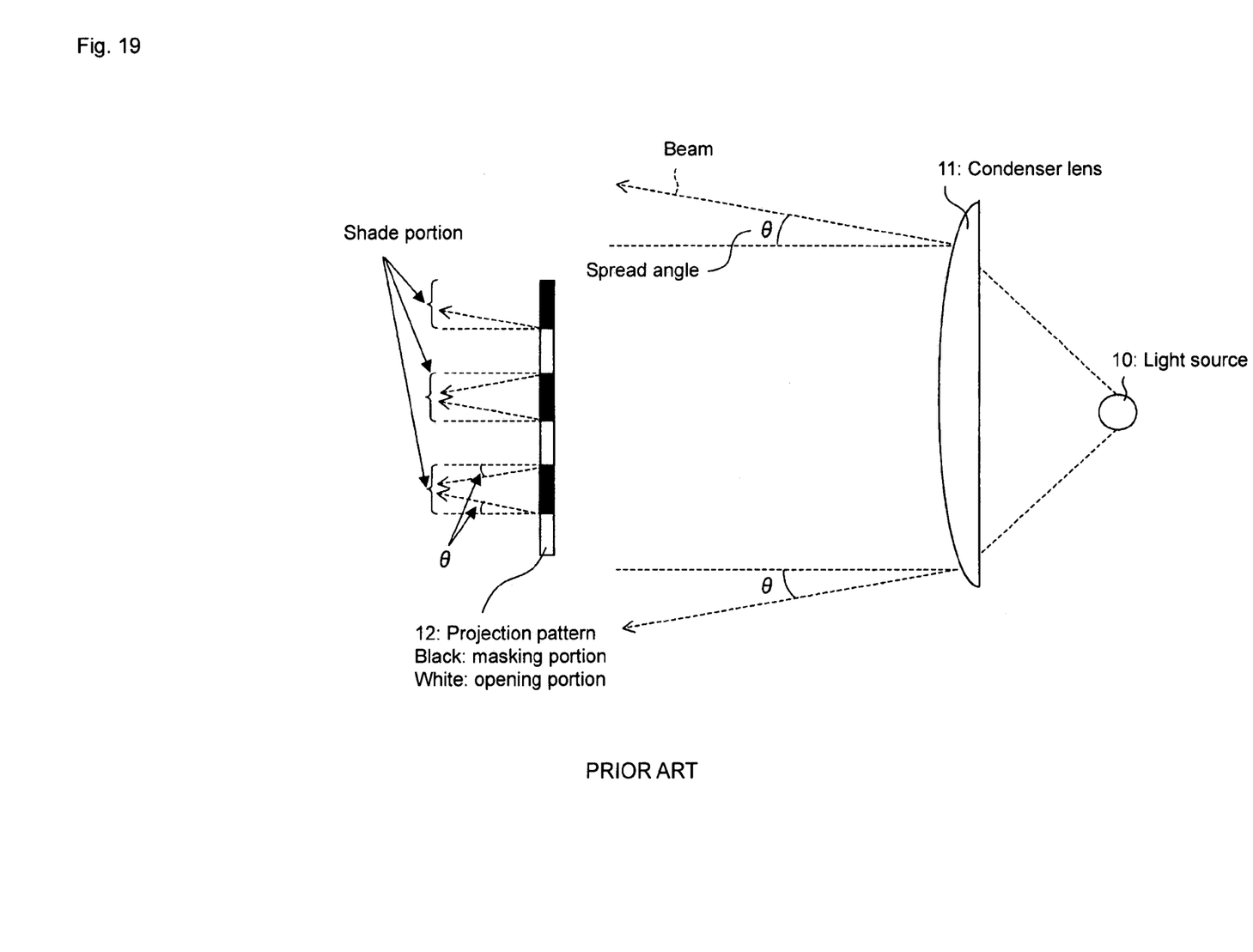
FIG. 19 shows a view for explaining a phenomenon in which light passed through an opening portion inserts into an image of a masking portion.

As shown in FIG. 19, the light irradiated from the light source 10 and condensed by the condenser lens 11 includes light having various wavelengths and therefore the light is not completely parallel light and becomes a beam having a spread angle θ. In addition, the spread angle θ is applied to any beam passed through any position of the lens plane of the condenser lens 11.

As a result, there are light beams irradiated towards the projection pattern 12 that are not perpendicularly (that is, by 0°) inserted with respect to the pattern formation plane of the projection pattern 12, instead the light is inserted from not less than 0° to not more than θ°, thereby producing a light that travels through the opening portions at an angle.

In other words, in the case of ideal parallel light, there appears a shade where a beam is not completely irradiated at the back of the masking portion; however, in fact, light inserted at not more than θ° toward the masking portion from the vicinity of the boundary between the opening portion and the masking portion is travels around the back of the masking portion, as shown in FIG. 19.

The light travels around the image center portion of the masking portion where luminance is the minimum, so that luminance at the center of the masking portion increases. An increase of the luminance at the center of the masking portion means an increase of the minimum value of the luminance of the sinusoidal wave pattern and luminance contrast of the obtained sinusoidal wave pattern decreases. An SN ratio of the obtained sinusoidal wave pattern decreases to cause a factor which interferes with measurement of accurate three-dimensional information.

Figure 10:
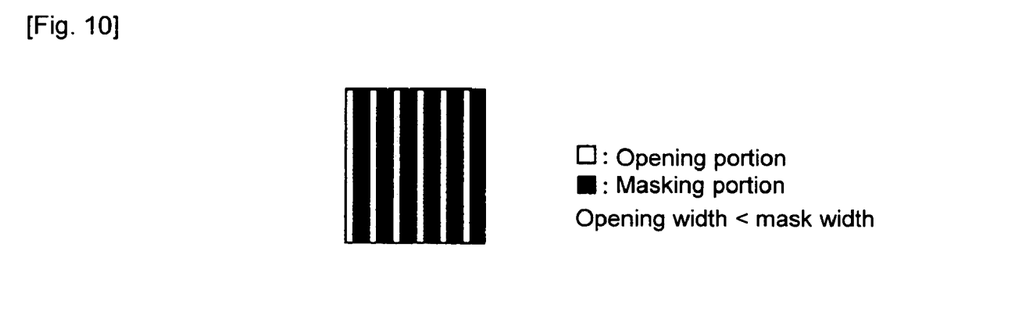
FIG. 10 shows a plan view of a ratio between opening width and mask width provided in a projection pattern in an embodiment according to the present invention.
Figure 18:
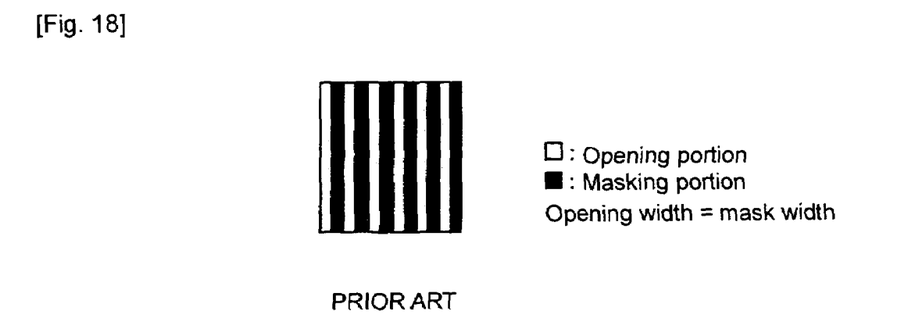
FIG. 18 shows a plan view of a ratio between opening width and mask width provided in a projection pattern in a the related art.

In contrast, in the pattern projection unit 1 of this embodiment, as shown in FIG. 10, the width of the masking portion of the projection pattern 12 is designed to be larger than that of the opening portion, different from the known configuration shown in FIG. 18 (opening width : mask width=1:1). The center of the masking portion separates from the opening portion by designing in such manner. Thus, the amount of light that travels around the image center of the masking portion decreases, so that luminance at the image center of the masking portion can be decreased. As a result, the luminance contrast of the obtained sinusoidal wave pattern increases and therefore accurate three-dimensional information can be measured.

Subsequently, imaging unit 3 records an image of the target object 200 along with the sinusoidal wave pattern projected onto it. The image obtained is transmitted to an image acquisition and processing unit 4 as digital data. Next, the image acquisition and processing unit 4 measures height information of the target object 200 by analyzing the sinusoidal wave pattern in the received image. As an analyzing method in this case, a known fringe analysis method, for example, a method disclosed in an article by Takeda et al. (J. Opt. Soc. Am, P. 72 to P. 156, 1982) can be used. Consequently, in this case, the fringe analysis method will be briefly described.

For example, when light of the sinusoidal wave pattern is irradiated to the target object 200 shown in FIG. 11A as an upper view and shown in FIG. 11B as a side view, a pattern formed on the surface of the target object 200 is shown as the left view in FIG. 12. In addition, in the drawing, although a fringe pattern is depicted in black or white binary without depicting a gradation portion, an actual fringe pattern is gradation having luminance gradient.

As shown in the left view in FIG. 12, when light of the sinusoidal wave pattern is irradiated to a physical body having height, the fringe pattern of the sinusoidal wave varies depending on the height of the physical body. The right view shown in FIG. 12 is a graph showing a relationship between pattern luminance in the standard plane having no convex portion or pattern luminance in the convex portion and the position in the scanning direction.

As shown in the same drawing, in the sinusoidal wave pattern projected to the physical body (convex portion) produces deviation in phase. The deviation depends on the height of the physical body and the height information of the physical body can be obtained by calculating the deviation.

Figure 13:
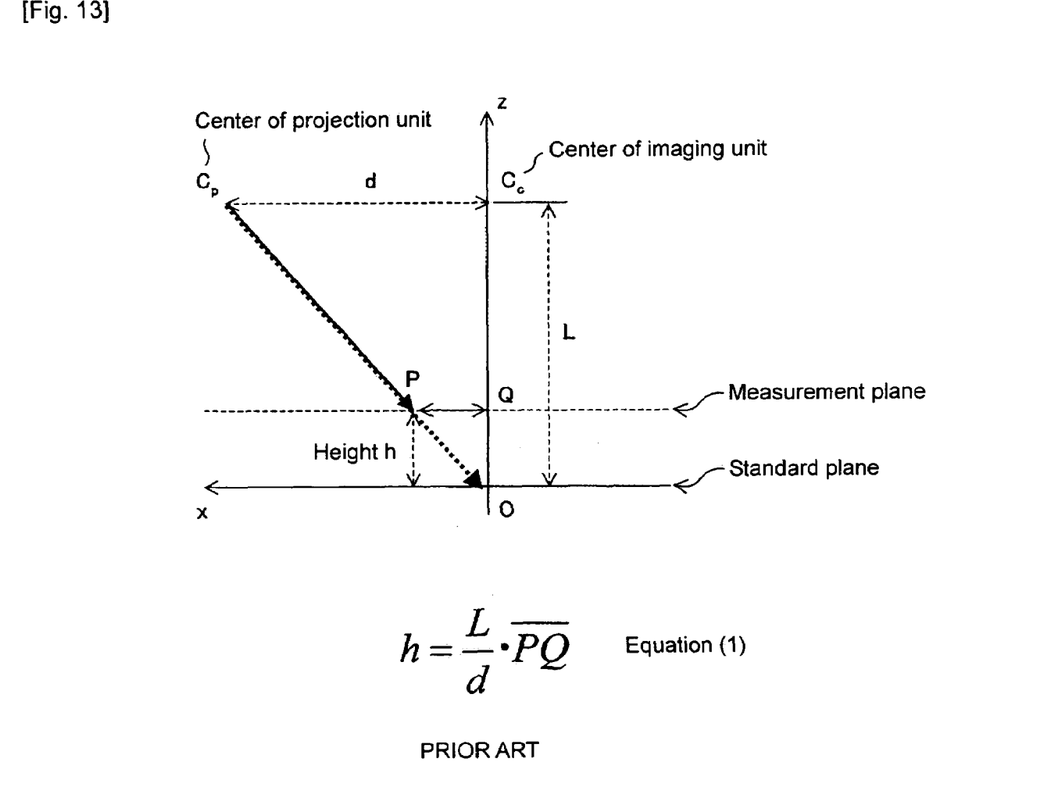
FIG. 13 shows a view for explaining the triangulation principle.

FIG. 13 shows the principle of height measurement (the triangulation principle). The height of the target object 200 is calculated as a distance from the standard plane. In order to describe simply, FIG. 13 shows the case in which a plane having a height of h from the standard plane is measured. It is assumed that a pattern projected from the pattern projection unit 1 is irradiated toward the position of the point O on the standard plane.

When the plane separated by a height of h is measured while the directions of the pattern projection unit 1 and the imaging unit 3 are kept positioned towards O in the standard plane, the pattern is projected to the point P. That is, as seen from the imaging unit 3, the point where the pattern is deviated by a distance PQ is measured, as compared with the case of imaging at the standard plane. This corresponds to the deviation of the pattern shown in FIG. 12.

If the position deviation PQ is used, the height can be calculated by Equation (1) based on the triangulation principle shown in FIG. 13. In this regard, however, d denotes a distance between optical axis centers of the imaging unit 3 and the pattern projection unit 1 and L denotes a distance from the imaging unit 3 to the standard plane, these of which are known values. In addition, the position deviation of the above-mentioned pattern is position deviation in the pattern having periodicity such as the sinusoidal wave and therefore it is called as phase difference.

The height information (three-dimensional shape information) of the target object 200 as measured in such manner corresponds to XY plane coordinates and the height information is retrievably stored in a database provided in a memory unit (not shown in the drawing) of the image acquisition and processing unit 4. Then, a user can browse the three-dimensional shape information of the target object 200 stored in the database by a display (not shown in the drawing) connected to the image acquisition and processing unit 4.

EXAMPLE

Next, an experimental example according to the present invention will be described using FIG. 15 to FIG. 17. In the present example, a liquid crystal element arranged in lattice shape was used as a projection pattern 12. The pitch of the opening portions of the projection pattern 12 (that is, a distance from the center of a certain opening portion to the center of the neighboring opening portions) was set to 100 µm. This corresponded to 10LP (Line Pair)/mm which was a value that was able to be easily manufactured without using a particular technique in the configuration of the liquid crystal element. According to this configuration, the size necessary for projecting a sinusoidal wave pattern having 200 pitches within one visual field was as follows:

100(µm)×200(pitch)=20(mm)

Consequently, this size is applicable to lens used in a usual 35 mm film camera or similar devices.

Figure 14:
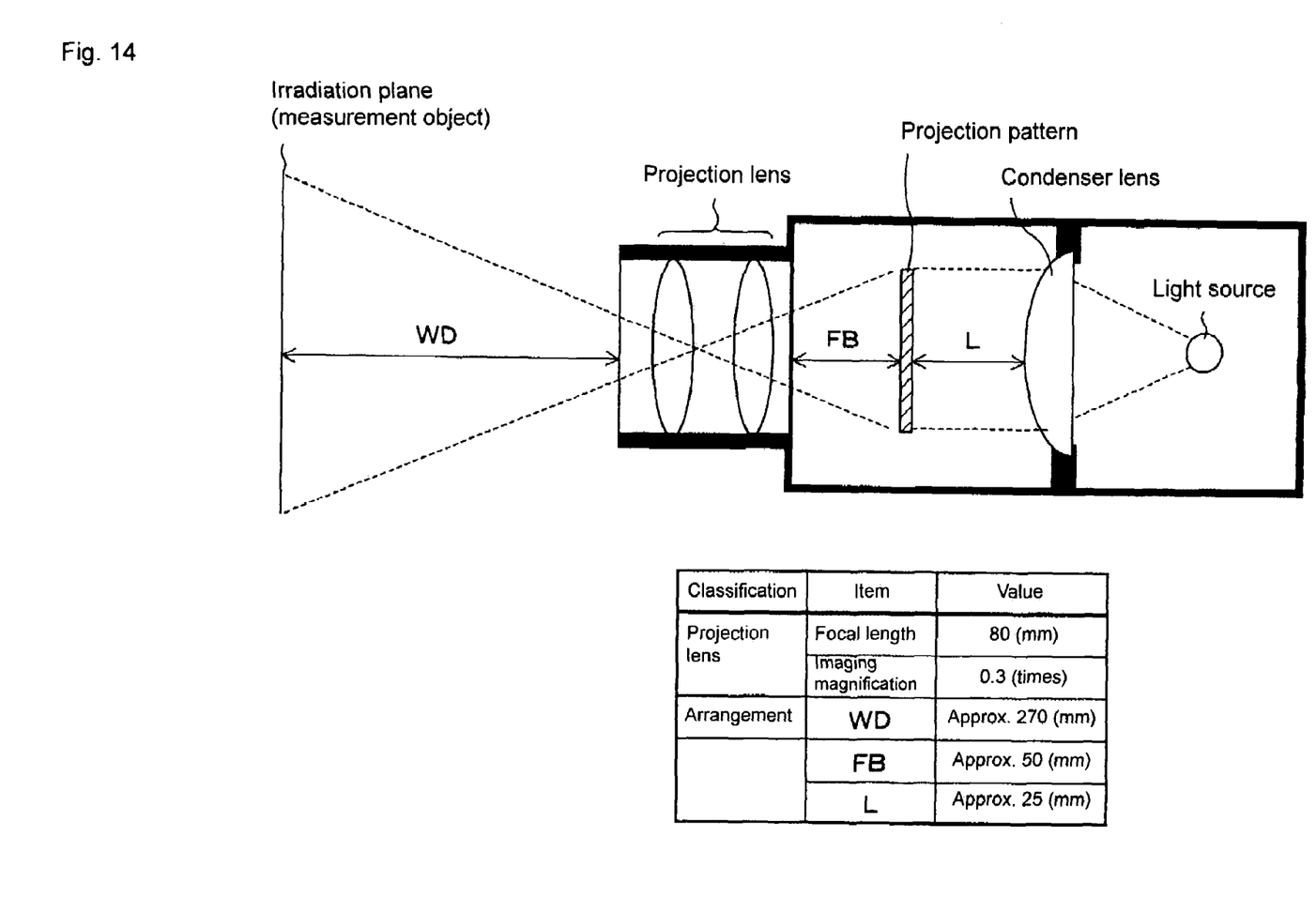
FIG. 14 shows a view of a configuration of a pattern projection unit in an embodiment according to the present invention.

The width of the opening portion and that of a masking portion was set to 1:1.7. Meanwhile, a condenser lens, a projection pattern, a projection lens, and an irradiation plane were arranged as shown in FIG. 14. More specifically, the condenser lens having a focal length of 80 mm and imaging magnification 0.3 times was used; and a distance between the condenser lens and the projection pattern was approximately 25 mm; a distance from the projection pattern to the projection lens was approximately 50 mm; and a distance from a main point of the projection lens to the irradiation plane was approximately 270 mm. Thereby, the image of the projection pattern was not focused onto the irradiation plane and the image defocused.

Figure 15:
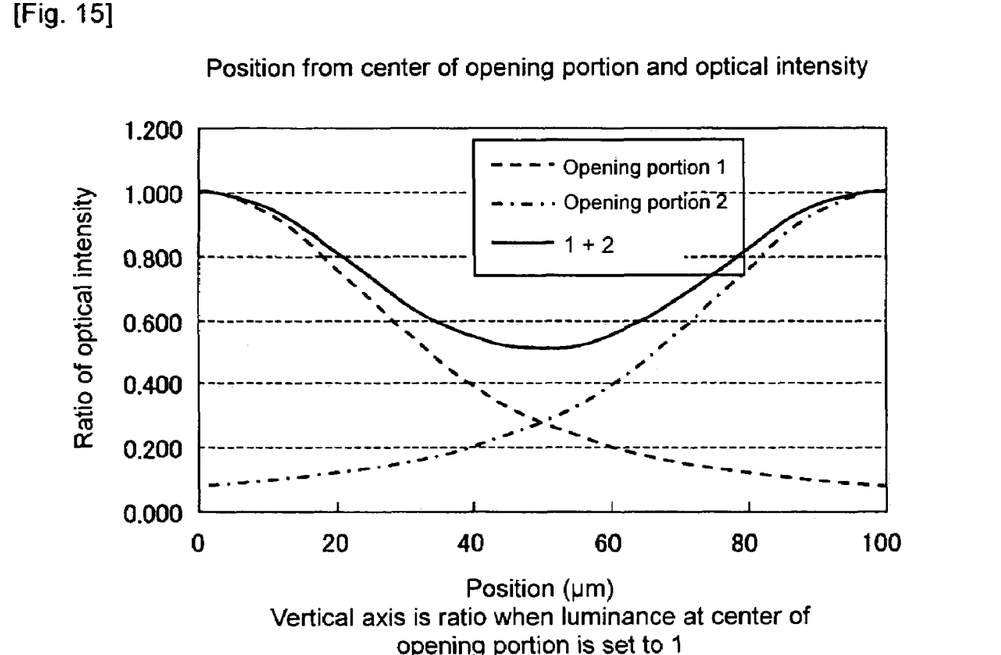
FIG. 15 shows a view of a state formed with a sinusoidal wave pattern in an example according to the present invention.

FIG. 15 is a graph showing luminance for 1 pitch of the pattern projected by such pattern projection unit. As shown in FIG. 15, luminance formed on the irradiation plane by light passing through a certain opening portion 1 is shown by a dash line. Then, luminance formed on the irradiation plane by light passed through an opening portion 2 of the neighboring opening portion 1 was shown by a dashed dotted line. Luminance actually formed on the irradiation plane is shown by a solid line in which these two luminances were overlapped. As shown in FIG. 15, when luminance of the image center of the opening portion was set to 1, luminance of the image center of the masking portion was approximately 0.5; luminance of the image was smoothly reduced from the opening portion center to the masking portion center and smoothly increased from the masking portion center to the neighboring different opening portion center; and thus formation of a pseudo sinusoidal wave pattern was examined.

Figure 16:
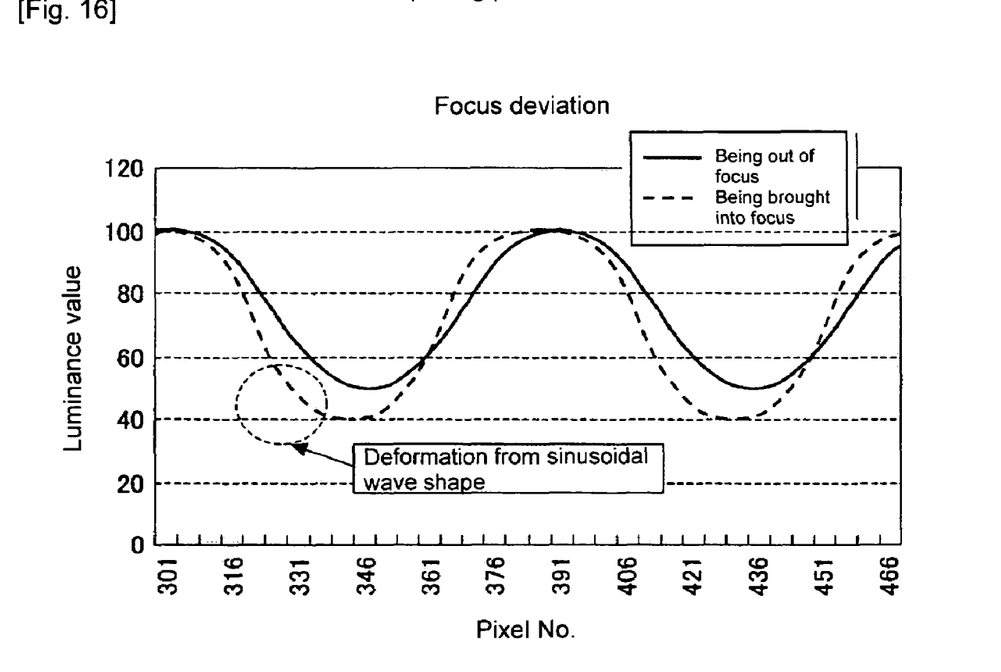
FIG. 16 shows a view of a comparison result between patterns projected on an irradiation plane in the case when a projection lens is out of focus and in the case when brought into focus in an example according to the present invention.

Furthermore, FIG. 16 shows a comparison result between the cases when the projection lens was out of focus and when the projection lens was brought into focus. In FIG. 16, a vertical axis shows luminance value obtained from an image in which a pattern actually projected to the standard plane was imaged by an imaging unit; and a horizontal axis shows pixel number(pixel no.) of the imaging unit. Then, there is shown a graph in which the case out of focus was depicted by a solid line (that is, the present example) and the case brought into focus was depicted by a dash line (that is, the comparison example). In this case, the same condition was adopted except for focus. As shown in FIG. 16, in the case brought into focus, it shows that luminance gradient from the image of the opening portion to the image of the masking portion increased and the sinusoidal wave was deformed. Whereas, in the present example, a pattern close to the sinusoidal wave was formed. From this result, it was verified that a configuration of the present example in which the projection lens was arranged out of focus was able to project the pattern closer to the sinusoidal wave than that of the comparison example.

Figure 17:
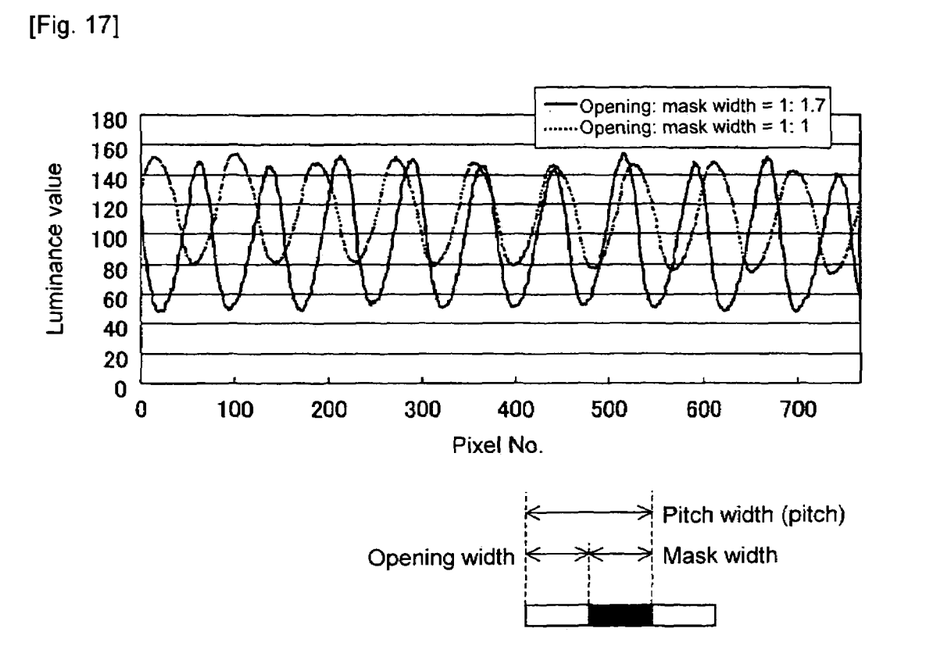
FIG. 17 shows a view of a comparison result between patterns projected on an irradiation plane in the case when a ratio between opening width and mask width is set to 1:1.7 and in the case when set to 1:1 in an example according to the present invention.

Finally, FIG. 17 shows a comparison result between cases when width of the opening portion (opening width) and width of the masking portion (mask width) were changed. In FIG. 17, a vertical axis shows luminance value obtained from an image in which a pattern actually projected to the standard plane was imaged by an imaging unit; and a horizontal axis shows pixel no. of the imaging unit. Then, there is shown a graph in which the case when a ratio between the opening width and the mask width was set to 1:1.7 was depicted by a solid line (that is, the present example) and the case when a ratio between the opening width and the mask width was set to 1:1 was depicted by a dash line (that is, the comparison example). In this case, the same condition was adopted except for the ratio between the opening width and the mask width. As shown in FIG. 17, luminance value at the center of the opening portion image (the maximum luminance value) was substantially the same value in the present example and the comparison example. While on the other hand, luminance value (the minimum luminance value) at the image center of the masking portion was approximately 50 in the present example; whereas, it was approximately 80 in the comparison example. As described above, it was verified that the configuration of the present example, that is, the case where the mask width was larger than that of the opening width became larger in amplitude of the sinusoidal wave pattern projected to the irradiation plane and increased in contrast.

The present invention is not limited to the above-mentioned embodiments and the examples and may be applicable to various changes and modifications in the scope of the appended claims. That is, embodiments obtained by combining technical means appropriately changed in the scope of the appended claims may be also included in the technical scope of the present invention.

Furthermore, it is to be clearly understood that, even if the value used is different from the value range described in this specification, it can be included in the present invention provided that a reasonable scope is given consistent with the spirit of the present invention.

What is claimed is:

1. A pattern light irradiation device for irradiating light having a pattern onto a physical object, comprising:
    a pattern forming plate provided with a plurality of opening portions;
    a light irradiation unit for irradiating light towards the pattern forming plate; and
    a projection lens irradiated by the light irradiation unit, for integrally condensing light passing through the opening portion of the pattern forming plate and guiding the condensed light onto the physical object,
    wherein the projection lens is arranged such that an image of the pattern forming plate is not focused onto the physical object, but is projected as a sinusoidal wave pattern, and
    wherein the interval between two neighboring opening portions of the pattern forming plate is larger than opening width of the opening portion.

2. A pattern light irradiation device according to claim 1, wherein the projection lens is a compound lens in which a plurality of single lenses is provided in series.

3. A pattern light irradiation device according to claim 1, wherein the pattern forming plate is composed of a plurality of liquid crystal elements; and
    the opening portions of the pattern forming plate and a masking portion sandwiched by the opening portions are formed by the presence or absence of applying voltage to the liquid crystal elements.

4. A pattern light irradiation device according to claim 1, wherein the light irradiation unit includes a light source for irradiating light and a condenser lens for condensing the light from the light source and guiding the light to the pattern forming plate.

5. A three-dimensional shape measuring device comprising:
    a pattern light irradiation device according to claim 1;
    an imaging device for imaging the physical object in which a sinusoidal wave pattern is projected by the pattern light irradiation device; and
    an image analysis device for analyzing the sinusoidal wave pattern in an image taken by the imaging device and calculating height information of the physical object.

6. A method of pattern light irradiation for irradiating light having a pattern onto a physical object, the method of pattern light irradiation comprising:
    a light irradiation process for irradiating light towards a pattern forming plate provided with a plurality of opening portions; and
    a projection process for irradiating the light passed through the pattern forming plate in the light irradiation process onto the physical object as light of a sinusoidal wave pattern, via a projection lens which is arranged out of focus such that an image of the pattern forming plate is not focused onto the physical objects,
    wherein the width between two neighboring opening portions of the pattern forming plate is larger than the opening width of the opening portion.

* * * * *